(12) United States Patent
Uratani (10) Patent No.: US 7,171,894 B2
(45) Date of Patent: Feb. 6, 2007

(54) REMOVABLE MARKING DEVICE FOR A MOLD

(75) Inventor: Hideki Uratani, Nishinomiya (JP)

(73) Assignee: Uratanishoji Kabushiki Kaisha, Japan Corporation, Osaka (JP)

(*) Notice: Subject to any disclaimer, the term of this patent is extended or adjusted under 35 U.S.C. 154(b) by 0 days.

(21) Appl. No.: 11/211,366

(22) Filed: Aug. 24, 2005

(65) Prior Publication Data

US 2006/0272519 A1 Dec. 7, 2006

(30) Foreign Application Priority Data

Jun. 3, 2005 (JP) ............................ 2005-164861

(51) Int. Cl.
*B41F 1/07* (2006.01)

(52) U.S. Cl. .................... 101/4; 425/182; 425/183; 425/190; 425/192; 425/193; 425/195; 249/103; 249/104

(58) Field of Classification Search ............... 425/182, 425/183, 190, 192, 193, 195; 101/4; 164/236; 249/103, 104, 182; 116/311, 312
See application file for complete search history.

(56) References Cited

U.S. PATENT DOCUMENTS

| | | | | |
|---|---|---|---|---|
| 5,788,872 A | * | 8/1998 | Uratani | 249/103 |
| 6,308,929 B1 | * | 10/2001 | Wieder | 249/103 |
| 6,722,273 B1 | * | 4/2004 | Navarra Pruna | 101/72 |
| 6,755,386 B2 | * | 6/2004 | Navarra Pruna | 249/103 |
| 6,889,954 B2 | * | 5/2005 | Navarra Pruna | 249/103 |
| 6,966,257 B2 | * | 11/2005 | Uratani | 101/4 |
| 2005/0199142 A1 | * | 9/2005 | Uratani | 101/28 |

* cited by examiner

*Primary Examiner*—Daniel J. Colilla
*Assistant Examiner*—Kevin D. Williams
(74) *Attorney, Agent, or Firm*—Curtis L. Harrington; Kathy E. Harrington; Harrington & Harrington

(57) ABSTRACT

The object of the present invention is to provide a removable marking device for a mold that enables to leave two marks of different meanings accurately with simple operation. A removable marking device for a mold has a control mechanism that allows said indicator axle to rotate with said rotatable tube when said indicator axle rotates in the other direction.

7 Claims, 7 Drawing Sheets

Prior Art

Prior Art

REMOVABLE MARKING DEVICE FOR A MOLD

FIELD OF THE INVENTION

This invention concerns a marking device for a mold to mark on molded products, and in particular to a removable marking device for a mold that can leave two marks with different meanings in exact positions.

BACKGROUND OF THE INVENTION

Surface of molded products generally have various indications such as a date of production, lot number, product number and so on by which producers can clear up causes of inferior molded products or check their stock.

A marking device is removably inserted into a mold with its indication portion facing the inner surface of the mold and held there during molding so that the above mentioned indications carried on the indication portion can be marked on each molded product.

Figure 6:
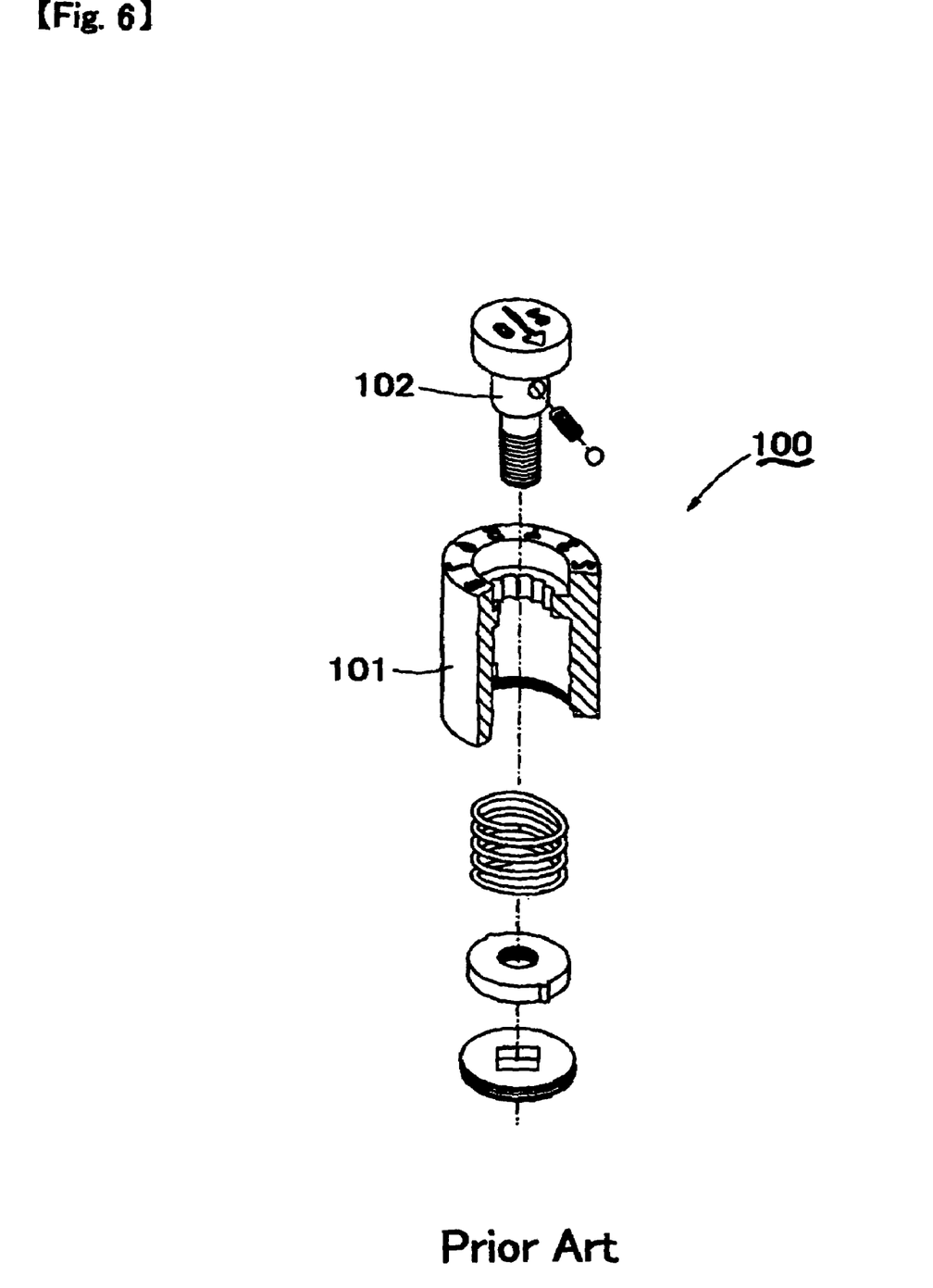
FIG. 6 shows a conventional removable marking device.

Such conventional marking device is disclosed in Japanese Patent No. 3470880. FIG. 6 represents the marking device disclosed in the patent.

As shown in FIG. 6, a conventional marking device (100) is mainly composed of an external tube (101) that is marked with letters on its upper surface and an indicator axle (102) that is rotatably inserted in the external tube (101).

Such conventional marking device (100) is utilized, for example, to mark molded items with manufacturing month and manufacturing year. In this case, as shown in FIG. 6, the upper surface of the external tube (101) is marked with numbers 1–12 that represent the manufacturing month and the indicator axle (102) is marked with a number (the example of FIG. 6 shows numbers "02" standing for the year of 2002) that represents the manufacturing year.

The marking device of this type has one problem when it is used to leave marks with different meanings such as "manufacturing month" and "manufacturing year" on molded items. That is, explaining with the example shown above, indicator axle (102) has to be replaced at the change of the year. This replacement requires a huge amount of work in a case plural molds are used to manufacture molded items.

Figure 7:
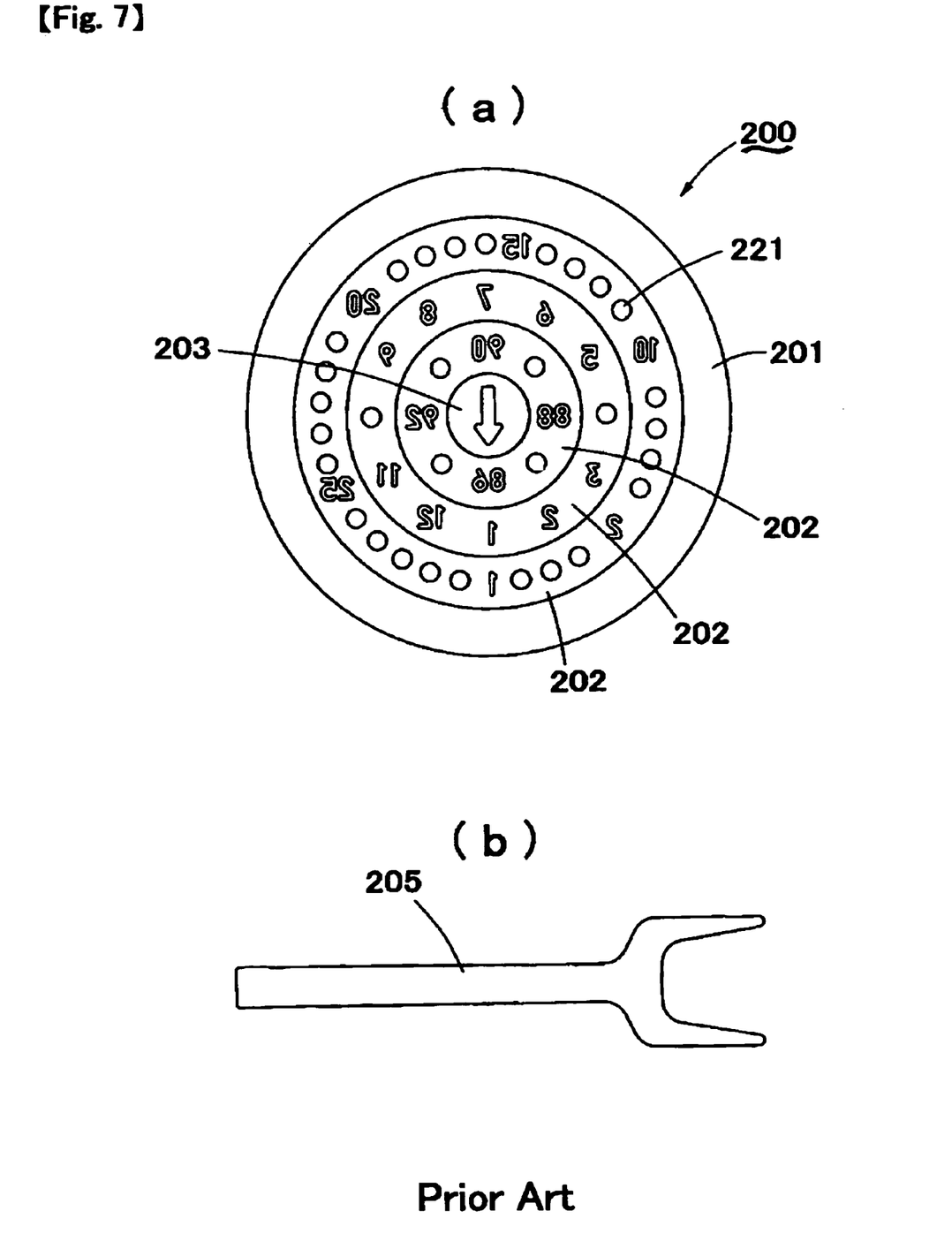
FIG. 7 shows a conventional removable marking device.

In Japanese utility model publication No. S63-101519A, another type of marking device is disclosed. FIG. 7 shows the marking device disclosed in the utility model publication. FIG. 7(*a*) is a plain view of the marking device of the utility model publication. FIG. 7(*b*) represents a jig for rotatably operating the marking device of FIG. 7(*a*).

Referring to FIG. 7, the marking device (200) disclosed in the utility model publication has a fixed tube (201) that is fixedly mounted to a molding device, a plurality of rotatable tubes (202) that is rotatably inserted in the fixed tube (201) and an indicator axle (203) that is disposed rotatably around the axis of the fixed tube (201). Each rotatable tube (202) is marked with letters on its upper surface.

This type of the marking device (200) is preferably used to leave marks with different meanings since the device has plurality of rotatable tubes (202).

However in rotating operation of the marking device disclosed in the above mentioned utility model publication, a jig for rotating operation (205) shown in FIG. 7(*b*) is required. To rotate the rotatable tube (202), it is necessary to insert the tip of a two-forked to a concave portion (221) provided on the upper surface of the rotatable tube (202) and to rotate the jig (205) for rotating operation around the axis.

In this operation, the adjacent rotatable tube (202) may rotate with the rotatable tube (202) to be rotated with the jig. Therefore adjustment of the marks on the upper surface of the marking device (200) is cumbersome.

The object of the present invention is, in consideration of the above, to provide a removable marking device for a mold that enables to leave two marks with different meanings accurately with simple operation.

According to the invention described in claim 1, the marking device facilitates the adjustment of the marked letters on the upper surface of the device by using a control mechanism that decides whether the indicator axle alone is allowed to rotate or both the indicator axle and the rotatable tube are allowed to rotate depending on the rotating direction of the indicator axle.

According to the invention described in claim 2 and 3, it is possible to position the rotatable tube in given places so as to improve the accuracy of positioning the marked letters on the upper surface of the marking device.

According to the invention described in claim 4 and 5, constant angular position of the base member with respect to the fixed tube is achieved to prevent the positioning error while assembling the marking device.

According to the invention described in claim 6, it is possible to prevent external substance such as dust from entering the marking device in order to avoid disorder of the control mechanism inside the marking device.

According to the invention described in claim 7, it is possible to adjust the position of the marked letters easily.

SUMMARY OF THE INVENTION

The invention concerning claim 1 relates to a removable marking device for a mold that consists of a substantially cylindrical fixed tube having carved letters on its upper surface, and said fixed tube fixed to said mold, a substantially cylindrical rotatable tube having carved letters on its upper surface, and the rotatable tube rotatably inserted into said fixed tube, an indicator axle rotatably inserted into said rotatable tube, a control mechanism that allows only said indicator axle to rotate when said indicator axle rotates in one direction and that allows said indicator axle to rotate with said rotatable tube when said indicator axle rotates in the other direction, wherein said control mechanism consists of a control space formed inside said rotatable tube, a fixing portion that moves in and out radially and that is inserted in the indicator axle, wherein said control space consists of a cylindrical space that is concentric with the axis of said rotatable tube and a projecting space protruding radially from said cylindrical space, and said projecting space having a pair of sides extending from said cylindrical space, wherein a line is defined by two points from which said a pair of sides starting outwardly and wherein the angle between one of said pair of sides and said line is different from the angle between the other of said pair of sides and said line.

The invention concerning claim 2 relates to the removable marking device for a mold described in claim 1 that further consists of a disk-shaped base member disposed in the bottom of said rotatable tube, a concave portion on the bottom surface of said rotatable tube and in a position corresponding to said carved letters on the upper surface of said fixed tube, wherein said base member has convex portions that can move in and out of said base member and that can be inserted in said concave portion.

The invention concerning claim 3 relates to the marking device for a mold described in claim 1 that further consists of a disk-shaped base member in the bottom of said rotatable tube, wherein said base member has a concave portion, wherein the bottom surface of said rotatable tube has convex portions that can move in and out of the bottom surface of said rotatable tube and that is disposed in the position corresponding to said letters that is carved on the upper surface of said fixed tube, wherein said convex portion can be inserted in said concave portion.

The invention concerning claim 4 relates to the marking device for a mold described in claim 2 that further consists of a fixing pin, wherein said fixing pin is inserted into a hole formed in a surrounding wall of said fixed tube and into a hole formed on the surrounding surface of said base member.

The invention concerning claim 5 relates to the marking device for a mold described in claim 3 that further consists of wherein said fixing pin is inserted into a hole formed in a surrounding wall of said fixed tube and into a hole formed on the surrounding surface of said base member.

The invention concerning claim 6 relates to the marking device for a mold described in claim 1 that further consists of a cover member that closes a bottom opening of said fixed tube.

The invention concerning claim 7 relates to the marking device for a mold described in claim 1 wherein the upper surface of said indicator axle has a concave portion in which the tip of a tool can be inserted.

DETAILED DESCRIPTION OF THE INVENTION

Hereinafter, embodiments of the removable marking device for a mold according to the present invention are explained with referring to the drawings.

Figure 1:
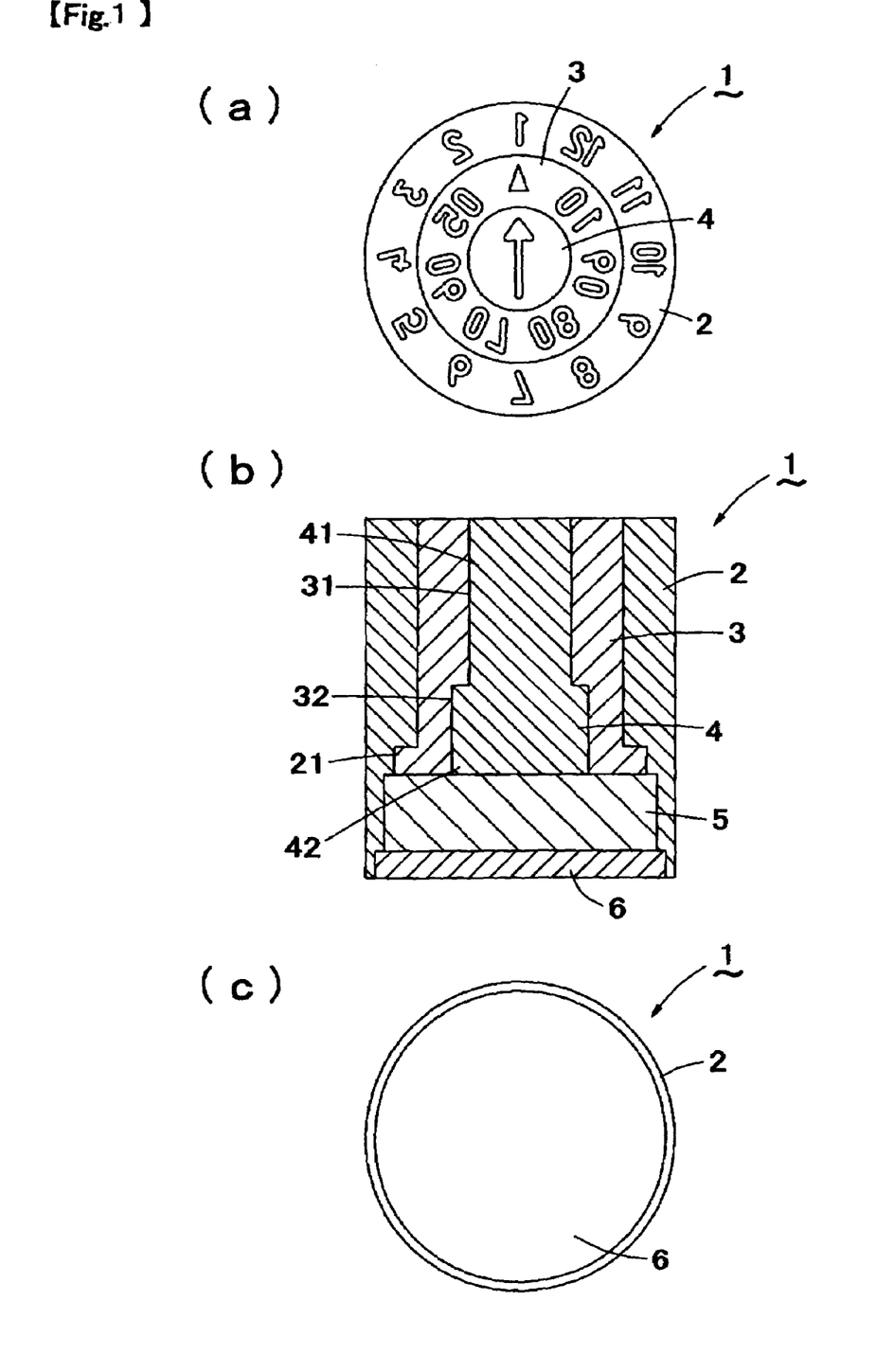
FIG. 1 shows the removable marking device for a mold according to the present invention.

FIG. 1 shows the removable marking device for a mold according to the present invention. FIG. 1(*a*) is a plan view of the marking device. FIG. 1(*b*) is a longitudinal sectional view of the marking device to show the main composition. FIG. 1(*c*) shows a bottom view of the marking device.

A marking device (1) consists of a substantially cylindrical fixed tube (2) that forms an outer circumferential contour of the marking device (1), and of a substantially cylindrical rotatable tube (13) that can be rotatably inserted into the fixed tube (2), and of an indicator axle (4) that can be rotatably inserted into the rotatable tube (3), and of a base member (5) that is disposed below the rotatable tube (3), and of a disk-shaped cover member (6) that closes a bottom opening of the fixed tube (2).

The marking device (1) is fit into a hole of a molding device so that the top surface is exposed to the cavity of the molding device. The outer circumferential contour of the fixed tube (2) closely contacts an inner wall of the hole of the molding device. Therefore, the fixed tube (2) does not rotate with respect to the mold device while an indicator axle (4) rotates (its details will be described later).

There are some steps on an inner wall of the fixed tube (2). Each step defines a position of the rotatable tube (2), the base member (5), and a cover member (6) so that the fixed tube (2) has internal spaces that widen downwardly step by step. An annular projection portion (21) that radially projects at the lower end of the rotatable tube (3) contacts the step of an inner wall of the fixed tube (2). In addition, the base member (5) and the cover member (6) respectively contact the steps formed at the inner wall of the fixed tube (2). Thus, the top surface of the rotatable tube (3) becomes leveled with that of the fixed tube (2).

As for examples shown in FIG. 1, numeric characters from "1" to "12" are carved on the top surface of the fixed tube (2) in order to indicate the manufacturing month. However, carved characters are not limited to numeric, and any characters can be carved.

An inner wall of the rotatable tube (3) has a step to axially position the indicator axle (2). Besides, the inside of the rotatable tube (3) has a lower space (32) and an upper space (31). The lower space (32) is wider than the upper space (31). The lower spaces comprise control spaces as a part of the control mechanism (its details will be described later).

The indicator axle (4) consists of a cylindrical upper pillar (41) forming the upper portion of the indicator axle (4), and of a lower pillar (42) forming the lower portion of the indicator axle (4). The lower pillar (42) is thicker than the upper pillar (41). The upper surface of the lower pillar (42) contacts the step on the inner wall of the rotatable tube (3).

The indicator axle (4) is as long as the rotatable tube (3). As mentioned above, the base member (5) and the cover member (6) respectively contact the steps on the inner wall of the fixed tube (2), and the top surface of the indicator axle (4) becomes leveled with that of the rotatable tube (4).

On the top surface of the rotatable tube (3), numeric characters from "05" to "10" are carved in order to indicate the manufacturing year, as well as a triangular mark is carved so as to point out particular numbers of the upper surface of the fixed tube (2).

A marking arrow is carved on the upper surface of the indicator axle (4). The configuration of the marking arrow corresponds to a tip of a slotted screwdriver, which can be inserted into the marking arrow.

The rotatable tube (3) rotates with respect to the fixed tube (2), whereas the indicator axle (4) rotates with respect to the rotatable tube (3). For example, when a triangular mark of the rotatable tube (3) points out the numeric character "1", and the marking arrow of the indicator axle (4) points out the numeric character "5", date of manufacturing can be marked on a mold, representing January of the year 2005.

In spite of a rotary action of the rotatable tube (3) or the indicator axle (4), the base member (5) does not rotate. In addition, the cover member (6) seals the lower opening of the fixed tube (2), which prevents dust from breaking in the marking device (1).

Figure 2:
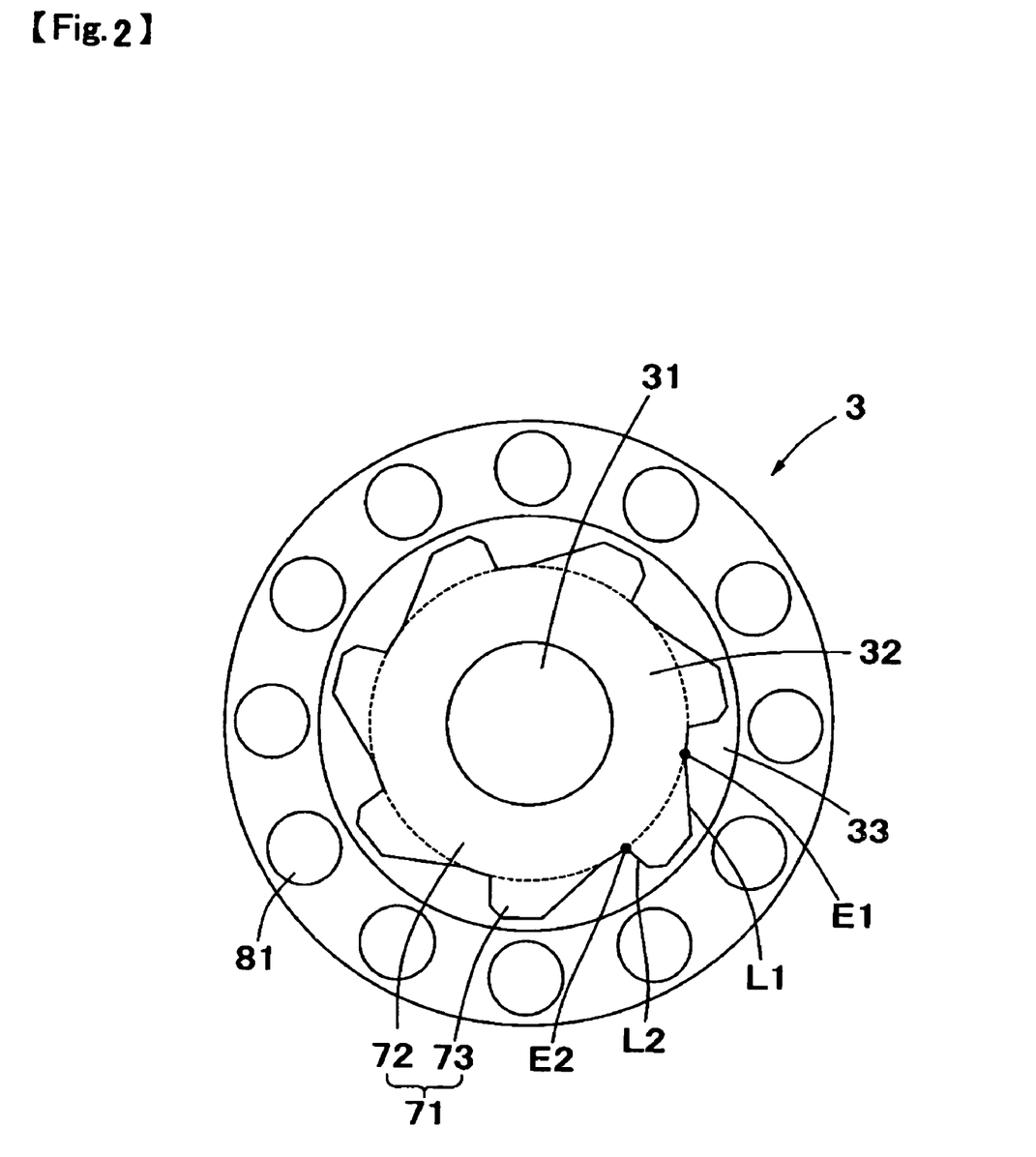
FIG. 2 shows the base structure of the rotatable tube for the removable marking device for a mold according to the present invention.

FIG. 2 is a bottom view of the rotatable tube (3), and describes the base structure of the rotatable tube (3) in detail.

A ring (33) for controlling rotary motion is fixed on the lower space (32) of the rotatable tube (3). The ring (33) has specific thickness. The inner space of the ring (33) is defined as a control space (71).

The control space (71) consists of a cylindrical space (72) defined as an inscribed circle of an inner wall of the ring (33) (i.e. a circle with the dotted line described in FIG. 2), and of a projecting space (73) that radially projects from the cylindrical space (72).

As shown in FIG. 2, the number of the projecting space (73) equals to the total number of marks or numeric characters carved on the top surface of the rotatable tube (3). The disposition of the project space (73) corresponds to that of these numeric characters or marks.

Thus, according to examples in FIG. 1, numeric characters from "05") to "10" and a triangular mark, six symbols of numeric characters and one mark, are carved on the top surface of the rotatable tube (3). Hence, these numeric characters and mark are disposed at even intervals in a circumferential direction. There are the same numbers of the projecting spaces (73) as the total characters on the top surface of the rotatable tube (3), and the projecting spaces (73) are distributed in accordance with the disposition of the characters. Thus, seven projecting spaces (73) are formed at even intervals in a circumferential direction.

The projecting space (73) shown in FIG. 2 has a trapezoidal cross section, which is not limited to a shape of FIG. 2. Thus, any shape can be used if the following conditions are fulfilled.

Referring to a pair of sides (L1, L2) extending from the cylindrical space (72), end points of L1 and L2 close to the cylindrical space (72) are defined as E1 and E2 respectively. As long as an angle of the side L1 with respect to a line connected points E1 and E2 differs an angle of the L2 with respect to a line connected points E1 and E2, the configuration of the projecting space (73) can be arbitrary.

Furthermore, one angle is preferably an acute angle, while the other angle is preferably an obtuse angle or a right angle.

Moreover, the bottom surface of the rotatable tube (3) has a concave portion (81). The concave portion (81) is disposed at the location which corresponds to characters, numeric characters, and marks carved on the top surface of the fixed tube (2). Hence, as for examples shown in FIG. 1, numeric characters from "1" to "12" are formed at even intervals in a circumferential direction. Therefore, at the bottom surface of the rotatable tube (3), twelve concaves (81) are formed at even intervals in a circumferential direction.

Figure 3:
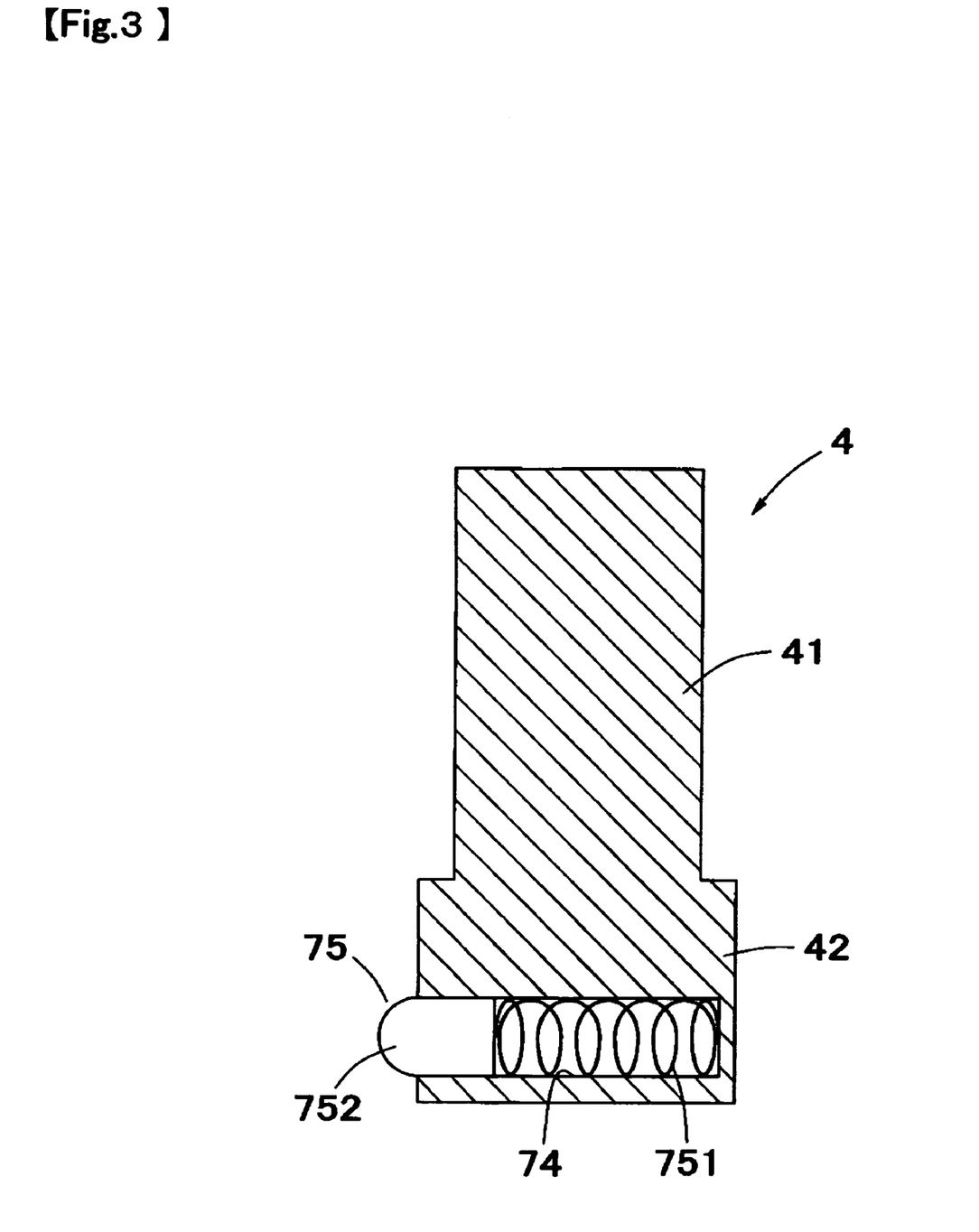
FIG. 3 is a longitudinal sectional view of the indicator axle for the removable marking device for a mold according to the present invention.

FIG. 3 is a cross section of the indicator axle (4), and describes the inside of the indicator axle (4) in detail. On the lower pillar (42) of the indicator axle (4), a hole (74) is formed along the diameter of the lower pillar (42). Besides, a fixing portion (75) is buried in the hole (74).

The fixing portion (75) consists of a coil spring (751) and a tip (752) attached to the tip of the coil spring (751). The tip (752) partially projects from the circumferential surface. When the coil spring (751) is compressed, this projecting portion can be completely accommodated within the hole (74). In addition, the tip (752) is hemispherical-shaped.

Figure 4:
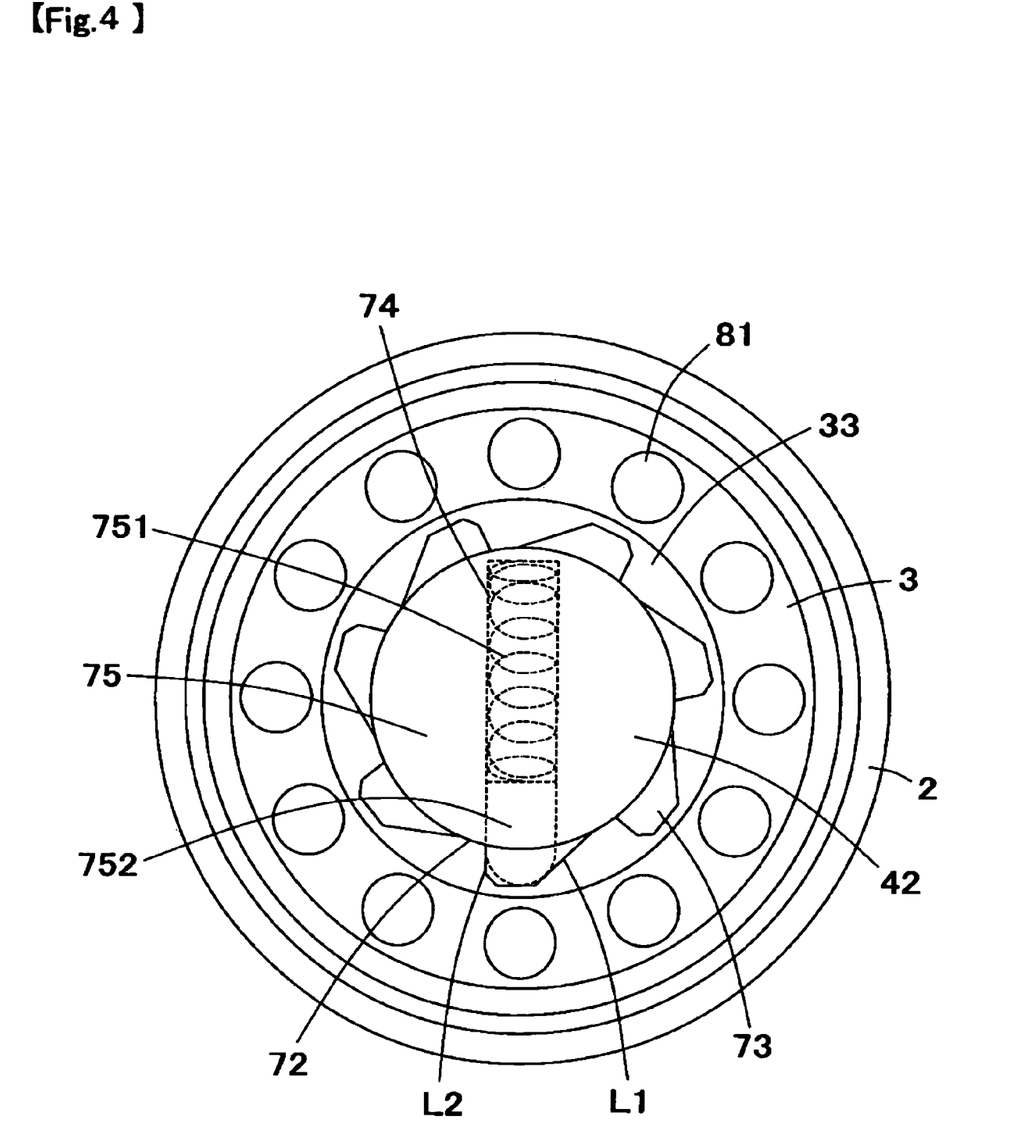
FIG. 4 shows the control mechanism for the removable marking device for a mold according to the present invention.

FIG. 4 is a bottom view of the marking device (1), and represents a condition without the cover member (6) and the base member (5).

A control mechanism comprises of the above-mentioned fixing portion (75) and control space (71).

The lower pillar (42) of the indicator axle (4) is inserted into the cylindrical space (72) surrounded by the dotted line shown in FIG. 3. The circumferential outline of the lower pillar (42) corresponds to the dotted line shown in FIG. 3. Furthermore, the tip (752) of the fixing portion (75) buried in the lower pillar (42) projects to the projecting space (73).

Under such circumstances, the indicator axle (4) rotates towards the edge L1 of the projecting space (73) having a moderate slope (i.e. the indicator axle (4) rotates counter-clockwise). At this time, the tip (752) of the fixing portion (75) is guided along the side L1 and is moved into the hole (74) formed by the lower pillar (42) with compressing the coil spring (751). When the tip (752) of the fixing portion (75) reaches to the adjacent projecting space (73), it once again projects from the lower pillar (42), which stops the rotary action of the indicator axle (4), and the indicator axle (4) is in position.

On the contrary, the indicator axle (4) rotates towards the side L2 of the projecting space (73) having a steep slope (i.e. the indicator axle (4) rotates clockwise). At this time, the tip (752) of the fixing portion (75) is caught on the side L2, which rotates the rotatable tube (3) with the indicator axle (4). Thus, the control mechanism allows the indicator axle (4) to rotate, or both the indicator axle (4) and the rotatable tube (3) to rotate by choice of rotation direction.

Figure 5:
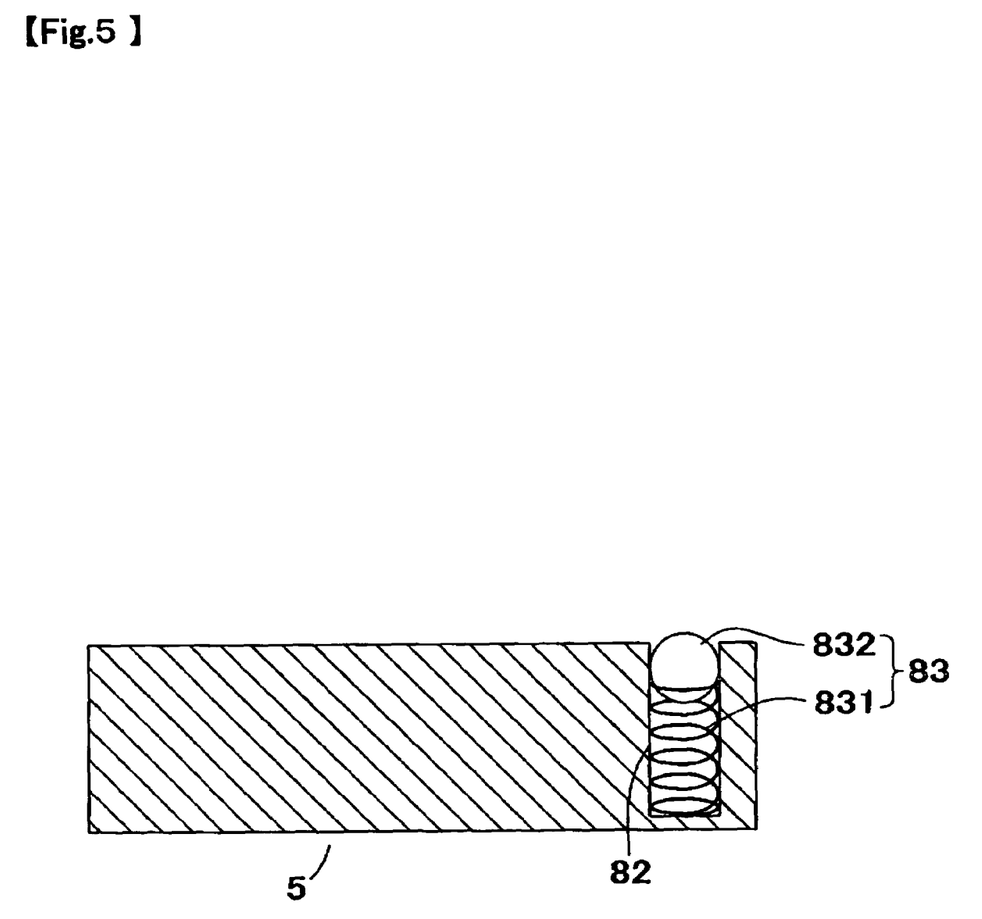
FIG. 5 shows the base member for the removable marking device for a mold according to the present invention.

FIG. 5 is a detailed cross sectional view of the base member (5). The base member (5) comprises a hole (82) on the top surface of the base member (5). A convex portion (83) is buried in a hole (82). The convex portion (83) consists of a coil spring (831) and a spherical tip (832) attached to the top end of the coil spring (831). A portion of the tip (832) can be projected from the top surface of the base member (5), as well as it can be moved inside the hole (82) by the coil spring's (831) compression.

The tip of the convex portion (83) is inserted into the concave portion (81) formed on the bottom surface of the rotatable tube (3) shown in FIG. 2 and FIG. 4, which positions the rotatable tube (3) at specific angular places.

Furthermore, it is preferable to form a hole through the wall of the fixed tube (2), and a hole on the circumferential surface of the base member (5), so that a pin can be inserted into both holes.

Hence, the convex portion (83) of the base member (5) can be at the constant positional relationship with characters, numeric characters, and marks, which rids errors of positioning resulting from assembling.

Furthermore, even though the structure of the convex portion (83) shown in FIG. 5 is employed instead of the concave portion (81) of the rotatable tube (3) and the concave portion (81) of the rotatable tube (3) shown in FIG. 2 and FIG. 4 is employed instead of the convex portion (83) of the base member (5), it is feasible to gain the same results in the above-mentioned structure.

The present invention is preferably applied to the removable marking device with a mark having different meanings.

What is claimed is:

1. A removable marking device for a mold comprising:
    a substantially cylindrical fixed tube having carved letters on its upper surface, and said fixed tube fixed to said mold,
    a substantially cylindrical rotatable tube having carved letters on its upper surface, and the rotatable tube rotatably inserted into said fixed tube,
    an indicator axle rotatably inserted into said rotatable tube,
    a control mechanism that allows only said indicator axle to rotate when said indicator axle rotates in one direction and that allows said indicator axle to rotate with said rotatable tube when said indicator axle rotates in the other direction, wherein said control mechanism comprises:
a control space formed inside said rotatable tube,
a fixing portion that moves in and out radially and that is inserted in the indicator axle,
wherein said control space comprises:
a cylindrical space that is concentric with the axis of said rotatable tube and
a projecting space protruding radially from said cylindrical space, and said projecting space having a pair of sides extending from said cylindrical space,
wherein a line is defined by two points from which said a pair of sides extend outwardly,
wherein the angle between one of said pair of sides and said line is different from the angle between the other of said pair of sides and said line.

2. The removable marking device for a mold described in claim 1, further comprising:
a disk-shaped base member disposed in the bottom of said rotatable tube,
a concave portion on the bottom surface of said rotatable tube and in a position corresponding to said carved letters on the upper surface of said fixed tube,
wherein said base member has convex portions that can move in and out of said base member and that can be inserted in said concave portion.

3. The removable marking device for a mold described in claim 1, further comprising a disk-shaped base member in the bottom of said rotatable tube,
wherein said base member has a concave portion,
wherein the bottom surface of said rotatable tube has convex portions that can move in and out of the bottom surface of said rotatable tube and that is disposed in the position corresponding to said letters that is carved on the upper surface of said fixed tube,
wherein said convex portion can be inserted in said concave portion.

4. The removable marking device for mold described in claim 2, further comprising a fixing pin,
wherein said fixing pin is inserted into a hole formed in a surrounding wall of said fixed tube and into a hole formed on the surrounding surface of said base member.

5. The removable marking device for mold described in claim 3, further comprising a fixing pin,
wherein said fixing pin is inserted into a hole formed in a surrounding wall of said fixed tube and into a hole formed on the surrounding surface of said base member.

6. The removable marking device for a mold described in claim 1, further comprising a cover member that closes a bottom opening of said fixed tube.

7. The removable marking device for a mold described in claim 1, wherein the upper surface of said indicator axle has a concave portion in which the tip of a tool can be inserted.

* * * * *